United States Patent [19]
Blaschke et al.

[11] 3,825,738
[45] July 23, 1974

[54] APPARATUS FOR GENERATING TWO AMPLITUDE-STABILIZED VOLTAGES

[75] Inventors: Felix Blaschke; Lothar Schleicher, both of Erlangen, Germany

[73] Assignee: Siemens Aktiengesellschaft, Munchen, Germany

[22] Filed: Sept. 7, 1972

[21] Appl. No.: 286,924

[30] Foreign Application Priority Data
Sept. 9, 1971   Germany............................ 2145134

[52] U.S. Cl.............................. 235/197, 235/186
[51] Int. Cl............................................ G06g 7/22
[58] Field of Search...... 235/197, 186, 189; 331/40, 331/135, 183

[56] References Cited
UNITED STATES PATENTS
3,419,815  12/1968  Porter................................. 331/40
3,482,086  12/1969  Caswell............................... 235/186
3,493,737  2/1970   Edelson............................... 235/189
3,671,731  6/1972   Denoncourt et al............. 235/186 X
3,710,088  1/1973   Blaschke et al................. 235/186 X

*Primary Examiner*—Joseph F. Ruggiero
*Attorney, Agent, or Firm*—Kenyon & Kenyon Reilly Carr & Chapin

[57] ABSTRACT

An apparatus for generating two amplitude-stabilized sinusoidal alternating-current voltages is disclosed. The apparatus includes a two-phase generator which is connected in cascade ahead of a vector analyzer. The output voltages of the two-phase generator are made to follow the output voltages of the vector analyzer with a control quantity which depends linearly on the difference between these voltages. The apparatus of the invention improves amplitude stabilization for the two-phase generator and accelerates the start-up thereof.

3 Claims, 4 Drawing Figures

APPARATUS FOR GENERATING TWO AMPLITUDE-STABILIZED VOLTAGES

The invention relates to an arrangement for generating two amplitude-stabilized, sinusoidal alternating-current voltages of variable frequency which are displaced with respect to each other by 90 electrical degrees, such as are frequently required to serve as sine-cosine transmitters in the areas of control, regulation and analog computer technology.

U.S. Pat. No. 3,419,815 discloses an amplitude-stabilized oscillator which consists of two integrators connected in tandem wherein the individual integrators are provided with beedback loops into which the amplitude error signal is fed multiplicatively. With such arrangements, however, the coupling factor, or more specifically, the gain in the feedback loop changes as a function of the amplitudes of the integrator output voltages; this has the disadvantage that the feedback signal causing a change of the amplitude in the direction toward the value to be stabilized depends exponentially on the output signal amplitude of the integrators, so that particularly at small amplitudes, a change can take place only very slowly.

SUMMARY OF THE INVENTION

It is an object of the invention tp provide an apparatus for generating two amplitude stabilized voltages that achieves a faster stabilization of the amplitude of the voltages. Subsidiary to this object, it is an object of the invention to provide such an apparatus which also accelerates the start-up of the two-phase generator of the apparatus.

The apparatus of the invention generates two amplitude stabilized sinusoidal alternating-current voltages of variable frequency mutually displaced 90 electrical degrees. According to a feature of the invention, the apparatus includes a two-phase generator for supplying two alternating-current voltages mutually displaced 90 electrical degrees and a vector analyzer having two dividers for forming respective guotient output voltages. The dividers have respective dividend inputs connected to the generator for receiving the voltages therefrom respectively and also have respective divisor inputs. Multiplier means individually receive and square the quotient output voltages. A comparator then adds the squared quotient output voltages and compares the sum voltage thereof to a voltage of constant magnitude to form a comparator output voltage representative of the difference between the sum voltage and the constant voltage. An integral controller connected to the comparator produces a controller output voltage that changes in accordance with changes in the comparator voltage. The divisor inputs of the dividers are connected to the output of the controller to receive the controller output voltage to amplitude stabilize the quotient output voltages.

With this arrangement, a constant output voltage amplitude at the output of the vector analyzer is forced regardless of the instantaneous amplitude of the output voltages of the two-phase generator, so that the two-phase generator itself no longer has to be stabilized to a very definite amplitude value, but must operate only within a wide amplitude range which is determined by the threshold and/or overload limits of the vector analyzer.

In oscillators, or more specifically in the known static two-phase generators of the kind mentioned above, considerable delays in the start-up of the generator can occur because of the exponential dependence of the feedback signal on the value of the amplitude, the feedback signal causing a change in amplitude. In order to also accelerate the start-up and to hold the amplitude of the output voltages at a constant value at the same time, another embodiment of the invention provides that the two-phase generator include two integrators arranged in a loop, one behind the other. The integrators have respective outputs for supplying the two alternating-current voltages to the dividend inputs of the dividers respectively. The integrators also have respective inputs to which respective mixer stages are connected. Each of the mixer stages is connected so as to receive the output voltage of the integrator to which the mixer stage is connected and the quotient output voltage corresponding to the last-mentioned output voltage of the integrator to form an input voltage for the corresponding integrator, this input voltage being linearly dependent upon the difference between said output voltages.

This embodiment is based on the concept to make the amplitudes of the phase voltages of the two-phase generator follow the amplitudes of the output voltages of the vector analyzer which correspond to the phase voltages. Accordingly, conditions result from this arrangement which are typical for linear controls, namely: in starting-up, that is begining with the amplitude value zero, the maximum amplitude change signal will appear in the two-phase generator and will then decrease linearly as it approaches the amplitude value of the output voltages of the vector analyzer.

A particularly simple embodiment of the invention is obtained if the two-phase generator includes negative feedback path means connecting the output of each integrator to the mixer stage corresponding thereto for negatively feeding back the output voltage of the integrator, and positive feedback path means connecting the output of each of the dividers to the mixer stage corresponding to the integrator supplying the input voltage for the divider for positively feeding back the quotient output voltage.

Still another embodiment of the invention provides that the two-phase generator again include two integrators arranged in a loop, one behind the other. The integrators have respective outputs for supplying the two alternating-current voltages to the dividend inputs of the dividers respectively. The integrators also have respective inputs. Here, however, respective multipliers are connected to the integrators at the inputs thereof. Each of the multipliers has first and second inputs. The first input of each of the multipliers is connected to receive the quotient output voltage of the divider corresponding to the integrator to which the multiplier is connected. A positive feedback path is connected to the output of the integral controller of the vector analyzer for positively feeding back the controller output voltage. An ancillary comparator is connected to the feedback path for receiving the controller output voltage and for comparing the same to a voltage of constant magnitude to form a difference voltage. A proportional-integral controller has an input for receiving the difference voltage and has an output connected to the second input of each of the multipliers. The integral participation of the proportional-integral controller compensates for the effect of nonlinearities that can be present in the components of the static two-phase generator.

Although the invention is illustrated and described herein as an apparatus for generating two amplitude-stabilized voltages, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS

Figure 1:
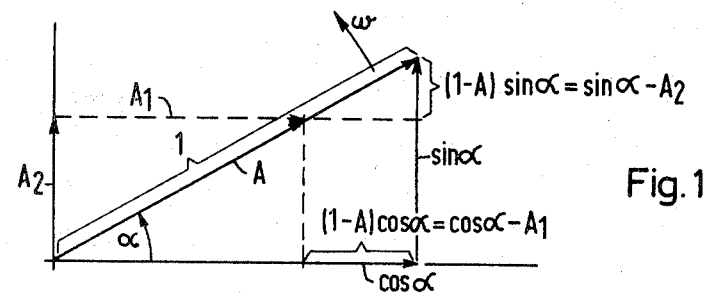
FIG. 1 is a vector diagram illustrating an alternating-current voltage and its orthogonal components as well as the components of a unit voltage which are obtained therefrom with the apparatus according to the invention.

In the vector diagram of FIG. 1, the output voltages $A_1$ and $A_2$ of a two-phase generator are mutually displaced electrically 90°. The vectors are shown as the orthogonal components of a rotating vector revolving with the angular velocity $\omega$, having a magnitude A and a phase angle of $\alpha$. Two voltages $\sin\alpha$ and $\cos\alpha$ are obtained from the two voltage components $A_1$ and $A_2$ by means of a vector analyzer as discussed below. Independently of the amplitude of the phase voltages $A_1$ and $A_2$, the two voltages $\sin\alpha$ and $\cos\alpha$ correspond to the orthogonal components of a unit vector of magnitude 1 which always points in the direction of the rotating vector A. In addition, the difference between the component voltages of the vector analyzer and the phase voltages of the two-phase generator is used as the correction quantity to match the magnitude of the rotating vector A to the value 1, that is, to the magnitude of the above-mentioned unit vector.

Figure 2:
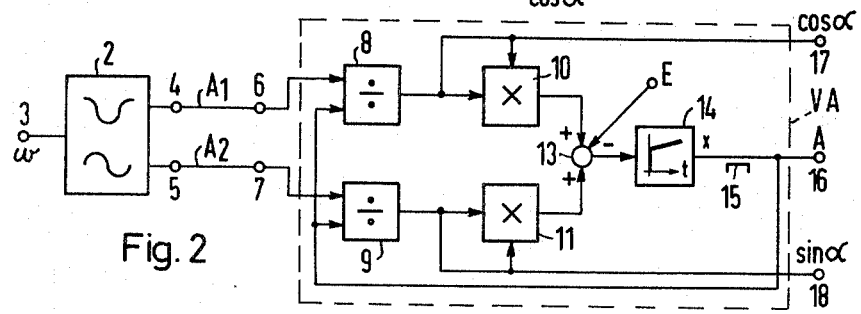
FIG. 2 is a schematic diagram of the apparatus of the invention for generating two amplitude stabilized alternating-current voltages. The diagram shows a two-phase generator connected in cascade with a vector analyzer from which the amplitude stabilized component voltages are taken.

The apparatus shown in FIG. 2 makes it possible to obtain two equal-phase alternating-current voltages of constant amplitude from two output voltages $A_1$ and $A_2$ of a two-phase generator 2, the voltages $A_1$ and $A_2$ being arbitrarily variable with respect to their amplitude. The two-phase generator 2 is represented by a block in the block diagram. In principle, the generator 2 can also be a rotary alternating-current voltage generator that generates output voltages proportional to the angular velocity of the rotor insofar as the amplitude is concerned; this would be inconvenient for the further processing if used as an angle-position transmitter. The two-phase generator 2 is acted upon at its input 3 by a frequency-determining quantity $\omega$ and supplies two alternating-current voltages $A_1$ and $A_2$ at its output terminals 4 and 5. In the case of a rotary generator, the quantity $\omega$ is the angular velocity. The voltages are displaced with respect to each other by 90 electrical degrees and have a frequency corresponding to the input quantity $\omega$. The amplitudes of the voltages $A_1$ and $A_2$ can vary arbitararily. The output terminals 4 and 5 are connected with the input terminals 6 and 7 of a vector analyzer VA. Such a vector analyzer is disclosed in *Deutsche Offenlegungsschrift* 1,941,312 and consists of two dividers 8 and 9 having dividend inputs which receive the output voltages $A_1$ and $A_2$ of the two-phase generator 2. The outputs of the dividers 8 and 9 are squared by multiplier means in the form of two multipliers 10 and 11. The output quantities of multipliers 10 and 11 are added in a mixer stage 13 which can be, for example, in the form of a summing amplifier. A constant voltage E is fed subtractively to the input of this mixer stage 13; this should be a voltage of the magnitude 1, that is, a so-called unit voltage. The output of the mixer stage 13 is supplied to an integrating controller in the form of the proportional-integral controller 14 which in turn has an output connected with the divisor inputs of the dividers 8 and 9. For reasons of stability, the controller 14 has a limiter 15 which can be, for example, in the form of a limiting diode and which limits its output voltage in the one direction to zero and thus admits only positive values of this output voltage. If the output quantity of the controller 14 is designated with x, and if it is noted that the output quantity of a proportional-integral controller ceases to change only when the sum of its input quantities vanishes, then the apparatus shown in FIG. 2 reaches its stationary state, that is, its balanced state, if the following relation holds:

$$(A_1/x)^2 + (A_2/x^2 = E = 1.$$

The output quantity of the controller 14 corresponds then exactly to the magnitude A of the rotating vector described by the component voltages $A_1$ and $A_2$, or to the amplitude of these component voltages, while, with this automatically produced stationary condition, the voltages of magnitudes $A_1/A = \cos\alpha$ and $A_2/A = \sin\alpha$ appear at the outputs of the dividers 8 and 9 respectively, that is, at the respective output terminals 17 and 18. At the output terminals 16, 17 and 18, voltages can therefore be taken off which correspond to the magnitude of the rotating vector described by the component voltages $A_1$ and $A_2$, as well as two voltages with stabilized amplitude corresponding to these alternating-current voltages.

Figure 3:
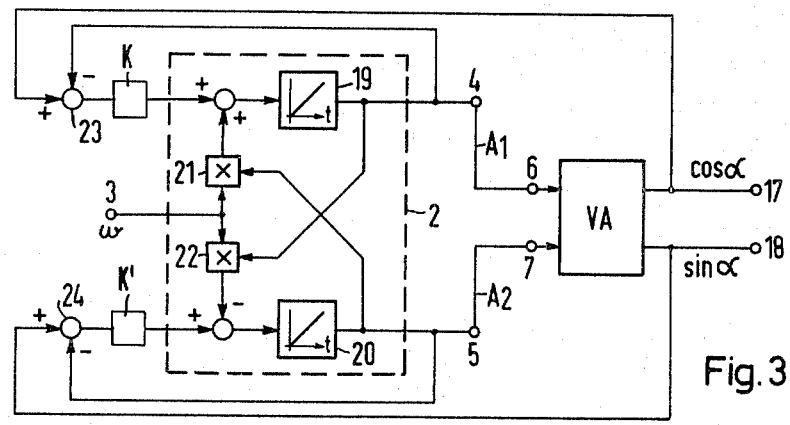
FIG. 3 illustrates another embodiment wherein not only the component voltages from the vector analyzer are stabilized, but also the output voltages of the two-phase generator.

In FIG. 3 is shown another embodiment of the invention by means of which not only the amplitude of the voltages appearing at the output terminals 17 and 18 of the vector analyzer VA are stabilized, but also the output voltages $A_1$ and $A_2$ of the two-phase generator 2. The two-phase generator 2 can, for example, include two integrators 19 and 20 arranged in a loop in tandem and which are preceded by the respective multipliers 21 and 22, the second inputs of these multipliers being connected with the input terminal 3. A direct-current voltage is applied to terminal 3 and determines the output frequency $\alpha$ of the two-phase generator. The output voltage $A_1$ of the two-phase generator and the output voltage $\cos\alpha$ of the vector analyzer VA are fed to a mixing stage 23 and there compared with each other, the output voltage $\cos\alpha$ being in phase with the output voltage $A_1$. The output quantity of the mixing stage 23 acts through a proportional member K having a gain that is arbitrarily selectable on the input of the integrator 19 and, depending on the amplitude of these two voltages, the positive-feedback influence of the output voltage $\cos\alpha$ of the vector analyzer or the negative-feedback influence of the output voltage $A_1$ will predominate until the output quantity of the mixing stage 23 has become zero, that is, the following relation holds: $\cos\alpha = A_1$. With this, however, the output voltage $A_1$ and the output voltage $\cos\alpha$ have equal amplitudes. In a similar manner, the amplitude of the output voltage $A_2$ appearing at the terminal 5 of the integrator 20 is made to follow the value of the amplitude of the output voltage $\sin\alpha$ appearing at the terminal 18 of the vector analyzer VA.

The quantities $(\cos\alpha - A_1)$ and $\sin\alpha - A_2)$ act upon the input of the integrators and cause an amplitude change in the voltages $A_1$ and $A_2$. It is noted that these quantities $(\cos\alpha - A_1)$ and $(\sin\alpha - A_2)$ become largest just when a large amplitude difference with respect to the output voltages of the two-phase generator and those of the vector analyzer exists, whereby a rapid and, above all, a reliable start-up of the static two-phase generator 2 is assured.

Figure 4:
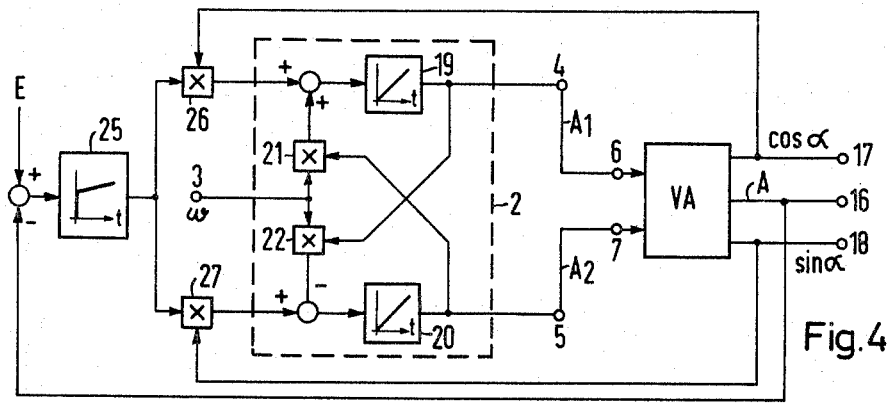
FIG. 4 illustrates another embodiment wherein the output of the proportional-integral controller in the vector analyzer is fed back and utilized to compensate for nonlinearities in the components of the two-phase generator.

The embodiment shown in FIG. 4 differs from that according to FIG. 3 in that the quantity delivered at the output terminal 16 is used as the actual value of a magnitude control which is achieved by means of a proportional-integral controller 25. The output voltage at output terminal 16 is proportional to the amplitude of the alternating-current voltages $A_1$ and $A_2$. A constant voltage E of magnitude 1 is fed to the controller 25 as a reference value. Two multipliers each having first and second inputs are provided. The output of the magnitude controller 25 is fed to the first inputs of two multipliers 26 and 27. The second inputs of the multipliers are connected to the quotient output of the dividers, respectively, of the vector analyzer VA. The quotient outputs correspond respectively to the voltages $\cos\alpha$ and $\sin\alpha$. To the inputs of the integrators 19 and 20, the outputs of the multipliers 26 and 27 now feed additionally an amplitude-changing supplementary current, until the amplitude of the output voltages $A_1$ and $A_2$ is exactly equal to the amplitude of the output voltages of the vector analyzer VA. It can be shown that also in the embodiment of FIG. 4, the supplemental quantity fed to the integrators 19 and 20 is a linear function of the amplitude difference of the voltages $A_1$ and $\cos\alpha$ as well as $A_2$ and $\sin\alpha$, respectively, so that here also, reliable, and most important, rapid start-up is obtained. Also, because of the integration effect of the magnitude controller 25, a faulty operation of the multipliers 21 and 22 can be compensated.

What is claimed is:

1. Apparatus for generating two amplitude stabilized sinusoidal alternating-current voltages of variable frequency mutually displaced 90 electrical degrees comprising: a vector analyzer and a two phase generator for supplying two alternating current voltages mutually displaced 90 electrical degrees comprising two integrators arranged in a loop, one behind the other, said integrators having respective outputs for supplying said two alternating current voltages to the vector analyzer, said integrators also having respective inputs; and mixer stages connected to said inputs of said integrators respectively, each of said mixer stages being connected so as to receive the output voltage of the integrator to which the the mixer stage is connected and the vector analyzer voltage corresonding to the last mentioned output voltage of the integrator to form an input voltage to the corresponding integrator linearly dependent upon the difference between said output voltages.

2. Apparatus for generating two amplitude stabilized sinusoidal alternating-current voltages of variable frequency mutually displaced 90 electrical degrees comprising: a vector analyzer including two dividers for forming respective quotient output voltages, said dividers having respective divident inputs connected to said generator for receiving said alternating-current voltages respectively, said dividers also having respective divisor inputs, multiplier means for individually receiving and squaring said quotient output voltages, comparator means for adding said squared quotient output voltages and comparing sum voltage thereof to a voltage representative of the difference between said sum voltage and said constant voltage, and an integral controller connected to said comparator for producing a controller output voltage that changes in accordance with changes in said comparator voltage, said divisor inputs of said dividers being connected to the output of said controller to receive said controller output voltage to amplitude stabilize said quotient output voltage; and a two-phase generator for supplying two alternating-current voltages mutually displaced 90 electrical degrees including two integrators arranged in a loop, one behind the other, said integrators having respective outputs for supplying said two alternating current voltages to said dividend inputs of said dividers respectively, said integrators having respective inputs; respective multipliers connected to said integrators at said inputs thereof, each of said multipliers having first and second inputs, said first input of each of said multipliers being connected to receive the quotient output voltage of the divider corresponding to the integrator to which the multiplier is connected; positive feedback path means connected to the output of said integral controller of said vector analyzer for positively feeding back said controller output voltage; ancillary comparator means connected to said feedback path means for receiving said controller output voltage and for comparing the same to a voltage of constant magnitude to form a difference voltage; and a proportional-integral controller having an input for receiving said difference voltage and having an output connected to the second input of each of said multipliers.

3. In the apparatus of claim 1, said two-phase generator comprising negative feedback path means connecting the output of each integrator to the mixer stage corresponding thereto for negatively feeding back the output voltage of the integrator, and positive feedback path means connecting the output of each of said dividers to the mixer stage corresponding to the integrator supplying the input voltage for the divider for positively feeding back the quotient output voltage.

* * * * *

UNITED STATES PATENT OFFICE
CERTIFICATE OF CORRECTION

Patent No. 3,825,738          Dated July 23, 1974

Inventor(s) Felix Blaschke et al

It is certified that error appears in the above-identified patent and that said Letters Patent are hereby corrected as shown below:

In Column 1, line 14, change "...provided with beedback..." to --...provided with feedback...--

In Column 1, line 26, change "...tp..." to --...to...--

In Column 1, line 40, change "...guotient output..." to --...quotient output...--

In Column 4, line 64, change "...output frequency $\alpha$..." to --...output frequency $\omega$...--

In Column 2, line 29, change "...begining with..." to --...beginning with...--

Signed and sealed this 26th day of November 1974.

(SEAL)
Attest:

McCOY M. GIBSON JR.
Attesting Officer

C. MARSHALL DANN
Commissioner of Patents